Jan. 11, 1966 A. C. EVANS 3,229,181
BISTABLE MOTOR REVERSING CIRCUITS
Filed Aug. 22, 1963
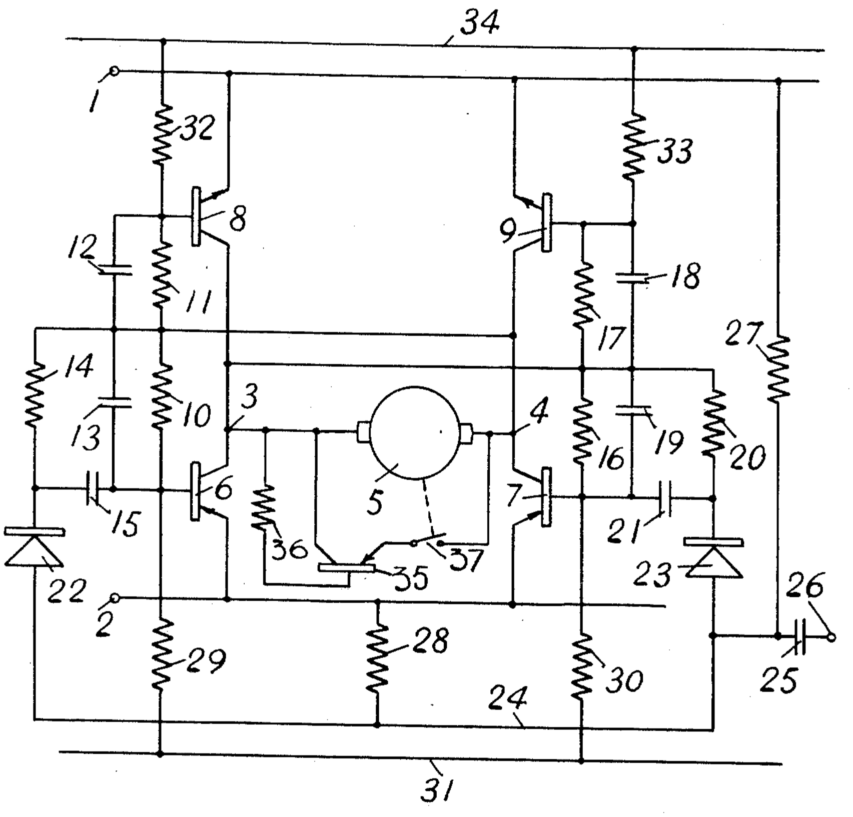

3,229,181
Patented Jan. 11, 1966

3,229,181

BISTABLE MOTOR REVERSING CIRCUITS

Anthony Cyril Evans, South Ruislip, Middlesex, England, assignor to Rotax Limited, London, England Filed Aug. 22, 1963, Ser. No. 303,784
Claims priority, application Great Britain, Aug. 24, 1962, 32,564/62
3 Claims. (Cl. 318—293)

The object of this invention is to provide a bistable circuit in a convenient form.

A circuit in accordance with the invention comprises in combination first and second terminals for connection to a source of direct or rectified alternating current so as to be of relatively negative and positive polarity in use respectively, third and fourth terminals having a reversible electric motor connected therebetween first and second p-n-p type transistors having their emitters connected to the second terminal and their collectors connected to the third and fourth terminals respectively, third and fourth n-p-n type transistors having their emitters connected to the third and fourth terminals respectively, a pair of resistors interconnecting the bases of the first and third transistors, a point intermediate the resistors being connected to the collectors of the second and fourth transistors, and a further pair of resistors interconnecting the bases of the second and fourth transistors, a point intermediate the further pair of resistors being connected to the collectors of the first and third transistors, the arrangement being such that, in use, the circuit can be switched, by suitable signals applied to the transistors, between one stable state in which the first and fourth transistors are conductive and current flows between the third and fourth terminals, and a second stable state in which the second and third transistors are conductive and current flows between the fourth and third terminals, the circuit further including a transistor having its collector and emitter connected to the third and fourth terminals respectively and its base connected to either the third or the fourth terminal depending on whether a p-n-p or an n-p-n transistor is employed, and a switch in the collector-emitter circuit of the transistor, said switch being operable by the motor so as to be closed when a shaft driven by the motor is in a predetermined angular position.

An example of the invention is illustrated in the accompanying drawing, in which are shown first, and second terminals 1, 2 for connection to a source of direct or rectified alternating current so that in use the terminal 1 is of negative polarity and the terminal 2 is of positive polarity or is earthed, and third and fourth terminals 3, 4 having connected therebetween a reversible electric motor 5.

There are further provided first and second transistors 6, 7 of the p-n-p variety having their emitters connected to the terminal 2 and their collectors connected to the terminals 3, 4 respectively. The terminals 3, 4 are also connected respectively to the collectors of third and fourth transistors 8, 9 of the n-p-n variety having their emitters connected to the terminal 1.

The bases of the transistors 6, 8 are interconnected through first and second resistors 10, 11 in series, a point intermediate the resistors 10, 11 being connected to the collectors of the transistors 7, 9. This point is also connected through a first capacitor 12 to the base of the transistor 8, and is connected to the base of the transistor 6 through parallel paths containing respectively a second capacitor 13, and a third resistor 14 and a third capacitor 15 in series.

The bases of the transistors 7, 9 are interconnected through fourth and fifth resistors 16, 17, a point intermediate these resistors being connected to the collectors of the transistors 6, 8. This point is also connected through a fourth capacitor 18 to the base of the transistor 9, and is connected to the base of the transistor 7 through parallel paths containing respectively a fifth capacitor 19, and a sixth resistor 20 and sixth capacitor 21 in series.

Points intermediate the capacitor 15 and the resistor 14, and the capacitor 21 and resistor 20 are connected through first and second diode rectifiers 22, 23 respectively to a line 24 connected through a seventh capacitor 25 to an input terminal 26, whilst the line 24 is connected to the terminals 1, 2 through seventh and eighth resistors 27, 28 respectively.

In order to understand the operation of the circuit so far decribed, assume that the transistor 6 is conductive, so that the potential at the terminal 3 is substantially that at the terminal 2. This potential is applied to the base terminals of the transistors 7, 9 so that the transistor 7 is cut off and the transistor 9 is conductive and the potential at the terminal 4 is substantially that at the terminal 1. Hence in this stable state current flows from the terminal 2 through the transistor 6, between the terminals 3, 4 and through the transistor 9 to the terminal 1. This current flow holds the transistors 6, 9 on and the transistors 7, 8 off and drives the motor 5 in one direction.

During the stable state described above, the anodes of the diode rectifiers 22, 23 are held at a negative potential determined by the resistors 27, 28. By virtue of the conduction of the transistor 9, the cathode of the rectifier 22 is connected to the terminal 1, and thus the receifier 22 is conductive, but by virtue of conduction of the transistor 6 the rectifier 23 has its cathode connected to the terminal 2, and is therefore non-conductive.

In order to switch the circuit to the alternative stable state a positive pulse is applied to the input terminal 26 and thence through the rectifier 22 to the base of the transistor 6 which is thus cut off. The transistor 8 now commences to conduct and acts in a manner similar to that previously described to render the transistor 7 conductive and to ensure that the transistors 6, 9 are non-conductive, so that in this stable state current flows in the direction of the terminals 4, 3 and drives the motor 5 in the opposite direction. Furthermore, the rectifiers 22, 23 are now rendered non-conductive and conductive respectively so that the next positive pulse applied to the input terminal 26 will switch the circuit back to original state.

The purpose of the capacitors 12, 13, 18, 19 is to increase the speed of operation of the circuit in known manner. Further, in order to ensure correct switching of the transistors under varying conditions of temperature, the bases of the transistors 6, 7 are preferably connected through resistors 29, 30 respectively to a line 31 which is more positive than the terminal 2, whilst the bases of the transistors 8, 9 are connected respectively through resistors 32, 33 to a line 34 at a greater negative potential than the terminal 1.

It will be appreciated that the diode rectifiers 22, 23 and associated components could be omitted, switching pulses being applied either to the base of the transistor 6 or to the base of the transistor 7, whichever is conductive.

In addition to the components described above, the circuit includes a p-n-p transistor 35 having its collector connected to the terminal 3, its base connected to the terminal 3 through a resistor 36, and its emitter connected to the terminal 4 through a switch 37 which is controlled by the motor 5 as indicated by the dotted line in the drawing. These additional components render the circuit of particular use with apparatus in which the motor 5 serves, when the transistors 6, 9 are conductive, to drive a shaft angularly in one direction from a rest position. However, when a pulse is received at the terminal 26, the transistors 7, 8 become conductive and the transistors 6, 9 non-conductive, so that the motor 5 then drives the shaft angularly in the opposite direction.

The arrangement is such that the switch 37 is operated by the shaft so as to be closed only when the shaft is in the rest position. With the shaft in the rest position and the transistor 7, 8 conducting, the transistor 35 conducts and the motor 5 is short circuited. A pulse applied to the terminal 26 now renders transistors 6, 9 conductive in place of transistors 7, 8, and the transistor 35 becomes non-conductive so that the motor 5 is energised even though switch 37 is still closed. The shaft now moves angularly and the switch 37 opens. On receipt of a further pulse at the terminal 26, the direction of operation of the motor 5 is reversed and the transistor 35 can conduct. However, the switch 37 is still open, so that the motor is not short-circuited until the shaft reaches its rest position.

Where the transistor 35 is of the n-p-n variety, its base is connected to the terminal 4. Moreover, the switch 37 could be in the collector circuit of the transistor 35.

Having thus described my invention, what I claim as new and desire to secure by Letters Patent is:

1. A bistable circuit comprising in combination first and second terminals for connection to a source of direct current so as to be of relatively negative and positive polarity in use respectively, third and fourth terminals having a reversible electric motor connected therebetween, a shaft driven by said motor, first and second p-n-p type transistors having their emitters connected to the second terminal and their collectors connected to the third and fourth terminals respectively, third and fourth n-p-n type transistors having their emitters connected to the first terminal and their collectors connected to the third and fourth terminals respectively, a pair of resistors interconnecting the bases of the first and third transistors, a point intermediate the resistors being connected to the collectors of the second and fourth transistors, and a further pair of resistors interconnecting the bases of the second and fourth transistors, a point intermediate the further pair of resistors being connected to the collectors of the first and third transistors, the arrangement being such that, in use, the circuit can be switched, by suitable signals applied to the transistors, between one stable state in which the first and fourth transistors are conductive and current flows between the third and fourth terminals to drive the shaft in one direction, and a second stable state in which the second and third transistors are conductive and current flows between the fourth and third terminals to drive the shaft in the opposite direction, the circuit further including a transistor having its collector and emitter connected to the third and fourth terminals respectively and its base connected to either the third or the fourth terminal depending on whether a p-n-p or an n-p-n transistor is employed, and a switch in the collector-emitter circuit of the transistor, said switch being operable by the motor so as to be closed when said shaft is in a rest position.

2. A bistable circuit as claimed in claim 1, including a terminal for connection to a source of triggering pulses, a pair of rectifiers connecting the terminal to the bases of the first and second transistors respectively, and means whereby the first and second rectifiers are conductive and non-conductive respectively when the first and fourth transistors are conductive, but are non-conductive and conductive respectively when the second and third transistors are conductive.

3. A bistable circuit as claimed in claim 1 in which the bases of the first and second transistors are connected to a line, which, in use, is at a greater positive potential than the second terminal, and the bases of the third and fourth transistors are connected to a line which, in use, is at a greater negative potential than the first terminal.

References Cited by the Examiner

UNITED STATES PATENTS

| | | | |
|---|---|---|---|
| 2,886,756 | 5/1959 | Schaefer | 318—384 |
| 2,976,469 | 3/1961 | Christiano | 318—293 |

OTHER REFERENCES

IBM Technical Disclosure Bulletin, volume 5, No. 12, May 1963.

ORIS L. RADER, *Primary Examiner.*

D. F. DUGGAN, *Assistant Examiner.*